United States Patent
Chang

(10) Patent No.: US 12,284,491 B2
(45) Date of Patent: Apr. 22, 2025

(54) VEHICLE AND METHOD FOR CONTROLLING THEREOF

(71) Applicants: Hyundai Motor Company, Seoul (KR); Kia Corporation, Seoul (KR)

(72) Inventor: Kyoung Jin Chang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 96 days.

(21) Appl. No.: 18/139,838

(22) Filed: Apr. 26, 2023

(65) Prior Publication Data
US 2023/0262383 A1 Aug. 17, 2023

Related U.S. Application Data

(62) Division of application No. 17/082,592, filed on Oct. 28, 2020, now Pat. No. 11,671,754.

(30) Foreign Application Priority Data

Jun. 24, 2020 (KR) ........................ 10-2020-0077390

(51) Int. Cl.
*H04R 3/00* (2006.01)
*G01C 21/36* (2006.01)
(Continued)

(52) U.S. Cl.
CPC ........... *H04R 3/00* (2013.01); *G01C 21/3629* (2013.01); *G01C 21/3644* (2013.01);
(Continued)

(58) Field of Classification Search
CPC ...... H04R 3/00; H04R 1/025; H04R 2499/13; G06T 7/90; G06T 9/00; G06F 40/30;
(Continued)

(56) References Cited

U.S. PATENT DOCUMENTS

2005/0232606 A1* 10/2005 Hosoda ................ G11B 27/326
386/280
2008/0319640 A1* 12/2008 Fujita ................... G09B 29/106
701/439
(Continued)

FOREIGN PATENT DOCUMENTS

CN 110364140 A 10/2019
CN 105893460 B 11/2019
(Continued)

*Primary Examiner* — Carolyn R Edwards
*Assistant Examiner* — Kuassi A Ganmavo
(74) *Attorney, Agent, or Firm* — Fox Rothschild LLP

(57) ABSTRACT

A vehicle selects various sound sources and outputs driving sound based on information received from the navigation system. A database stores sound sources classified as first and second emotions. A controller outputs a landmark name based on a route guidance text and outputs a ratio of the first and second emotions corresponding to the landmark name. The controller selects a first sound source from the sound sources classified as the first emotion based on the first emotion ratio, selects a second sound source from the sound sources classified as the second emotion based on the second emotion ratio and determines first and second playback periods based on the ratios of the first and second emotions. The controller outputs a first sound generated based on the first sound source during the first playback period and a second sound generated based on the second sound source during the second playback period.

13 Claims, 9 Drawing Sheets

(51) Int. Cl.
*G06F 18/22* (2023.01)
*G06F 18/23* (2023.01)
*G06F 40/30* (2020.01)
*G06T 7/90* (2017.01)
*G06T 9/00* (2006.01)
*G06V 10/56* (2022.01)
*G07C 5/02* (2006.01)
*G10K 15/02* (2006.01)
*H04R 1/02* (2006.01)

(52) U.S. Cl.
CPC .............. *G06F 18/22* (2023.01); *G06F 18/23* (2023.01); *G06F 40/30* (2020.01); *G06T 7/90* (2017.01); *G06T 9/00* (2013.01); *G06V 10/56* (2022.01); *G10K 15/02* (2013.01); *H04R 1/025* (2013.01); *G07C 5/02* (2013.01); *H04R 2499/13* (2013.01)

(58) Field of Classification Search
CPC ......... G06F 18/22; G06F 18/23; G06V 10/56; G06V 20/56; G01C 21/3629; G01C 21/3644; G10K 15/02; G07C 5/02; G11B 27/105
See application file for complete search history.

(56) References Cited

U.S. PATENT DOCUMENTS

| | | | | |
|---|---|---|---|---|
| 2011/0040707 | A1* | 2/2011 | Theisen | G11B 27/105 |
| | | | | 706/46 |
| 2015/0248767 | A1* | 9/2015 | Poree | G06T 7/11 |
| | | | | 382/164 |
| 2016/0144782 | A1* | 5/2016 | Jo | B60Q 9/00 |
| | | | | 381/86 |
| 2019/0304418 | A1 | 10/2019 | Silverstein | |
| 2020/0324697 | A1* | 10/2020 | Lee | B60W 40/08 |

FOREIGN PATENT DOCUMENTS

| | | | |
|---|---|---|---|
| JP | 4036047 B2 | * | 1/2008 |
| KR | 20100038692 A | * | 4/2010 |
| KR | 10-1886534 B1 | | 8/2018 |
| KR | 10-1982345 B1 | | 5/2019 |
| KR | 2019-0100543 A | | 8/2019 |
| KR | 2019-0137727 A | | 12/2019 |

\* cited by examiner

VEHICLE AND METHOD FOR CONTROLLING THEREOF

CROSS-REFERENCE TO RELATED APPLICATION

This Application is a Divisional of application Ser. No. 17/082,592 filed on Oct. 28, 2020. Application Ser. No. 17/082,592 claims under 35 U.S.C. § 119(a) the benefit of Korean Patent Application No. 10-2020-0077390, filed on Jun. 24, 2020, which is hereby incorporated by reference herein.

BACKGROUND

Field of the Disclosure

The present disclosure relates to a vehicle and a control method thereof for changing a driving sound based on data received from a navigation system.

Description of Related Art

In modern society, automobiles are the most used means of transportation, and their number is increasing. In the past, automobiles did not exist more than simply as a means of transportation, but in the modern world, vehicles are widely used as a means of expressing themselves or enjoying a drive beyond just a means of transportation. Accordingly, there are many people who enjoy speed like motorbikes and racing vehicles, and those who enjoy such speeds feel a lot of excitement not only from the speed of the vehicle, but also from the operating sound and vibration sound generated by the engine of the vehicle. Accordingly, some drivers use the engine by modifying the engine to obtain the driving sound they desire.

In particular, for an electric vehicle, since the operating sound and vibration sound generated by the vehicle engine are absent, the driving sound artificially generated through the speaker is also output. However, since the driving sound provided to the vehicle is a driving sound previously designed by the manufacturer, it is difficult to satisfy the driver's demand.

SUMMARY

A vehicle for selecting various sound sources and outputting driving sound based on information received from a navigation system, and a control method thereof are provided.

In accordance with an aspect of the present disclosure, a vehicle may include database configured to store a plurality of sound sources classified as a first emotion and a plurality of sound sources classified as a second emotion; speaker; and controller configured to output a landmark name based on a route guidance text included in a driving route information calculated by a navigation system, output a ratio of the first emotion and a ratio of the second emotion corresponding to the landmark name based on the landmark name, select a first sound source from among a plurality of sound sources classified as the first emotion based on the ratio of the first emotion, select a second sound source from among a plurality of sound sources classified as the second emotion based on the ratio of the second emotion, determine a first playback period and a second playback period based on the ratio of the first emotion and the ratio of the second emotion, output a first sound generated based on the first sound source during the first playback period, and output a second sound generated based on the second sound source during the second playback period.

The controller may be configured to output the landmark name included in the route guidance text using Natural Language Processing (NLP). The controller may be configured to output the ratio of the first emotion and the ratio of the second emotion corresponding to the landmark name using the landmark name as input data of a long short-term memory (LSTM).

The controller may be configured to determine a plurality of first target engine sound orders based on at least one of output torque, speed, and accelerator pedal pressure of the vehicle during the first playback period in which the first sound is output and synthesizes the first sound based on the first sound source and the plurality of first target engine sound orders, and determine a plurality of second target engine sound orders based on at least one of output torque, speed, and accelerator pedal pressure of the vehicle during the second playback period in which the second sound is output and synthesizes the second sound based on the second sound source and the plurality of second target engine sound orders.

The controller may be configured to select a first target engine sound order of some of the plurality of first target engine sound orders based on the ratio of the first emotion and the ratio of the second emotion, and synthesize the first sound based on the first sound source and the selected partial first target engine sound order, and select a second target engine sound order of some of the plurality of second target engine sound orders based on the ratio of the first emotion and the ratio of the second emotion, and synthesize the second sound based on the second sound source and the selected partial second target engine sound order.

Additionally, the controller may be configured to determine volume of the first sound and the second sound based on at least one of an output torque, a speed, and an accelerator pedal pressure of the vehicle. The first emotion and the second emotion may be one of happiness, joy, sadness, vigor, fear, anger, or tranquility.

In accordance with an aspect of the present disclosure, a vehicle may include database configured to store a plurality of sound sources classified as a first terrain and a plurality of sound sources classified as a second terrain; speaker; and controller configured to receive map image output from a navigation system, output a ratio of first color and a ratio of second color forming the map image by processing the map image, select a first sound source from among a plurality of sound sources classified as the first terrain based on the ratio of the first color, select a second sound source from among a plurality of sound sources classified as the second terrain based on the ratio of the second color, determine a first playback period and a second playback period based on the ratio of the first color and the ratio of the second color, output a first sound generated based on the first sound source during the first playback period by the speaker, and output a second sound generated based on the second sound source during the second playback period.

The controller may be configured to compress the map image, and cluster the compressed map image by color using a K-means algorithm. The controller may be configured to match the first color to the first terrain, and match the second color to the second terrain. The controller may be configured to determine a plurality of first target engine sound orders based on at least one of output torque, speed, and accelerator pedal pressure of the vehicle during the first playback period in which the first sound is output and synthesize the first sound based on the first sound source and the plurality of first target engine sound orders, and determine a plurality of second target engine sound orders based on at least one of output torque, speed, and accelerator pedal pressure of the vehicle during the second playback period in which the second sound is output and synthesize the second sound based on the second sound source and the plurality of second target engine sound orders.

The controller may be configured to select a first target engine sound order of some of the plurality of first target engine sound orders based on the ratio of the first color and the ratio of the second color, and synthesize the first sound based on the first sound source and the selected partial first target engine sound order, and select a second target engine sound order of some of the plurality of second target engine sound orders based on the ratio of the first color and the ratio of the second color, and synthesize the second sound based on the second sound source and the selected partial second target engine sound order.

The controller may be configured to determine volume of the first sound and the second sound based on at least one of an output torque, a speed, and an accelerator pedal pressure of the vehicle. The first terrain and the second terrain may be one of a city, mountain, river, highway, beach or tunnel.

In accordance with an aspect of the present disclosure, a controlling method of a vehicle including a database storing a plurality of sound sources classified as a first emotion and a plurality of sound sources classified as a second emotion, the method may include outputting a landmark name based on a rout guidance text included in a driving route information calculated by a navigation system, outputting a ratio of the first emotion and a ratio of the second emotion corresponding to the landmark name based on the landmark name, selecting a first sound source from among a plurality of sound sources classified as the first emotion based on the ratio of the first emotion, select a second sound source from among a plurality of sound sources classified as the second emotion based on the ratio of the second emotion, determining a first playback period and a second playback period based on the ratio of the first emotion and the ratio of the second emotion, output a first sound generated based on the first sound source during the first playback period, and outputting a second sound generated based on the second sound source during the second playback period.

The outputting of a ratio of the first emotion and a ratio of the second emotion corresponding to the landmark name based on the landmark name may include outputting the landmark name included in the route guidance text using Natural Language Processing (NLP). Additionally, the outputting of a ratio of the first emotion and a ratio of the second emotion corresponding to the landmark name based on the landmark name may include outputting the ratio of the first emotion and the ratio of the second emotion corresponding to the landmark name by using the landmark name as input data of a long short-term memory (LSTM).

In accordance with an aspect of the present disclosure, a controlling method of a vehicle including a database storing a plurality of sound sources classified as a first terrain and a plurality of sound sources classified as a second terrain, the method may include: receiving map image output from a navigation system; outputting a ratio of first color and a ratio of second color forming the map image by processing the map image; selecting a first sound source from among a plurality of sound sources classified as the first terrain based on the ratio of the first color; selecting a second sound source from among a plurality of sound sources classified as the second terrain based on the ratio of the second color; determining a first playback period and a second playback period based on the ratio of the first color and the ratio of the second color; outputting a first sound generated based on the first sound source during the first playback period by the speaker, and outputting a second sound generated based on the second sound source during the second playback period.

The outputting of a ratio of first color and a ratio of second color forming the map image by processing the map image may include compressing the map image, and clusters the compressed map image by color using a K-means algorithm. The selecting of a first sound source from among a plurality of sound sources classified as the first terrain based on the ratio of the first color includes selecting a second sound source from among a plurality of sound sources classified as the second terrain based on the ratio of the second color includes matching the first color to the first terrain, and matching the second color to the second terrain.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
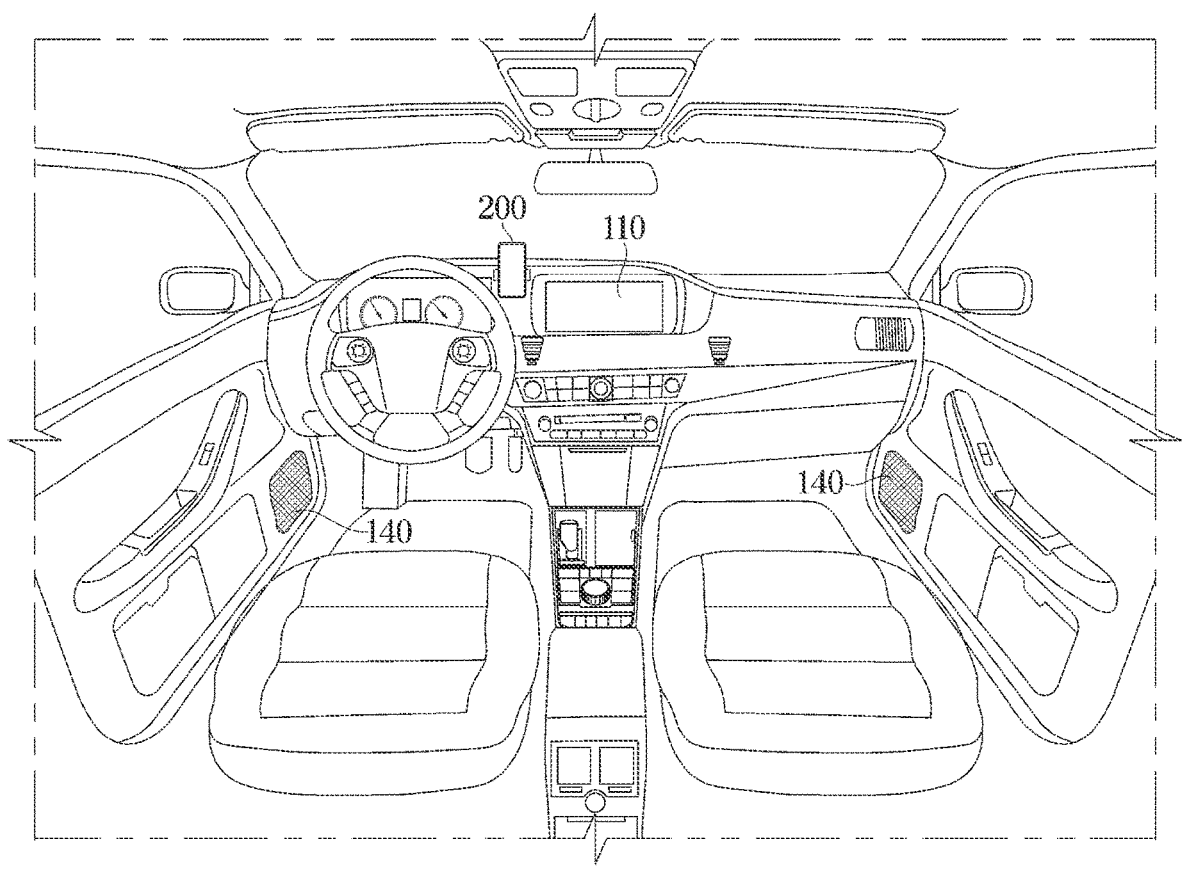
FIG. 1 is a diagram illustrating an interior of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present disclosure belongs. This specification does not describe all elements of the exemplary embodiments of the present disclosure and detailed descriptions on what are well known in the art or redundant descriptions on substantially the same configurations may be omitted.

Throughout the specification, when an element is referred to as being "connected to" another element, it may be directly or indirectly connected to the other element and the "indirectly connected to" includes being connected to the other element via a wireless communication network. The term 'part, module, member, block' used in the specification may be implemented in software or hardware, and a plurality of 'part, module, member, block' may be embodied as one component. It is also possible that one 'part, module, member, block' includes a plurality of components. Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated. Singular expressions include plural expressions unless the context clearly indicates an exception. In addition, terms such as "~unit", "~group", "~block", "~member", and "~ module" may mean a unit that processes at least one function or operation. For example, the terms may refer to at least one hardware such as Field-Programmable Gate Array (FPGA)/Application Specific Integrated Circuit (ASIC), at least one software stored in a memory, or at least one process processed by a processor.

The symbols attached to each step are used to identify each step, and these symbols do not indicate the order of each step, and each step is executed differently from the specified order unless a specific order is clearly stated in the context. Hereinafter, with reference to the accompanying drawings will be described the working principle and exemplary embodiments of the present disclosure.

FIG. 1 is a diagram illustrating an interior of a vehicle according to an exemplary embodiment. Referring to FIG. 1, the vehicle according to the exemplary embodiment may include the AVN apparatus 110 and the speaker 140, and the driver of the vehicle according to the exemplary embodiment may own the navigation terminal 200. A controller may operate the various components of the vehicle.

The audio video navigation (AVN) apparatus 110 may refer to a multimedia device in which audio, video, navigation, and telematics terminals are integrated into one. The AVN apparatus 110 may be configured to provide a driving route guidance to the user by receiving a destination set by the user, calculating driving route information based on the destination and the current location of the vehicle, and displaying the calculated driving route information.

Specifically, the AVN apparatus 110 may be configured to request the user to select a destination by receiving a destination name from the user via a touch input or a voice input and displaying a list of locations matching the input destination name. Additionally, the AVN apparatus 110 may be configured to provide guidance on the driving direction of the vehicle by generating driving route information based on a driving route set according to a destination selected by the user and displaying the generated driving route information.

Driving route information may include TBT information indicating direction information such as 11 o'clock, 1 o'clock, right turn, 5 o'clock, U-turn, 8 o'clock, left turn, and route guidance text to guide the driving direction, and map image based on the current location of the vehicle is driving. The TBT information and route guidance text may be output as voice through the audio system of the AVN apparatus 110, and the TBT information, route guidance text and map image may be visually output through the screen of the AVN apparatus 110.

The AVN apparatus 110 may be provided in the center fascia of the vehicle, but is not limited thereto. The navigation terminal 200 owned by the driver may also provide the same functions as the AVN apparatus 110. The navigation terminal 200 may refer to a user terminal such as a driver's smart phone, tablet personal computer (PC), or laptop, and may refer to any terminal device capable of executing a navigation application that guides a route to a destination.

A screen displayed on the navigation terminal 200 based on short-range communication and/or long-distance communication with the vehicle may be displayed on the AVN apparatus 110 of the vehicle. Hereinafter, the AVN apparatus 110 provided in the vehicle and/or the navigation terminal 200 owned by the driver will be collectively referred to as a navigation system.

The speaker 140 may be configured to output various sounds inside the vehicle. Speakers 140 for this purpose may be provided on both doors of the vehicle, but may be provided without limitation as long as the driver inside the vehicle may listen to the sound output. The speaker 140 may refer to any device capable of converting an electrical signal into sound and outputting the sound. For this purpose, the speaker 140 may include a voice coil and an amplifier configured to adjust the volume of the output sound by adjusting the amount of current supplied to the voice coil.

Figure 2:
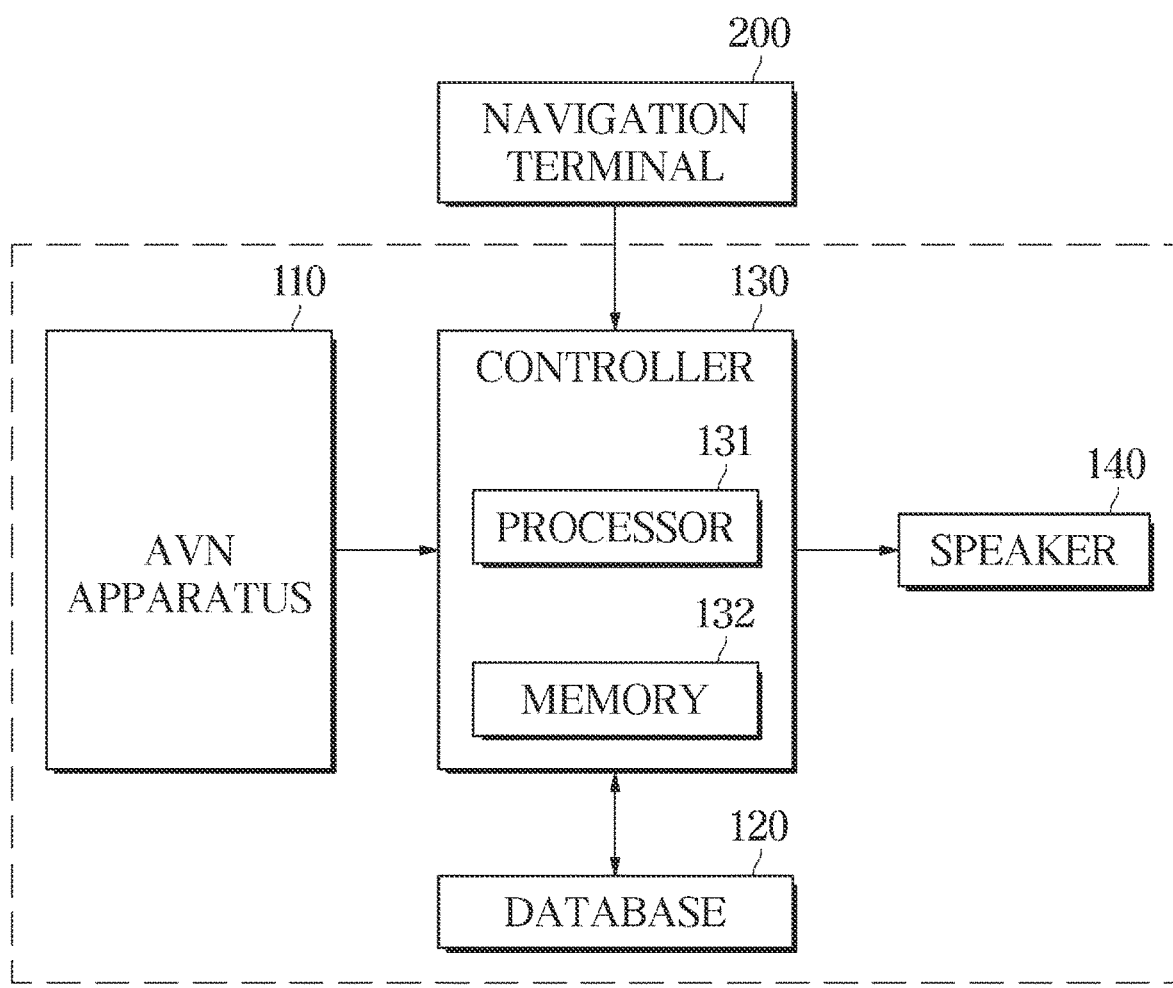
FIG. 2 is a control block diagram of a vehicle according to an exemplary embodiment.

FIG. 2 is a control block diagram of a vehicle according to an exemplary embodiment. Referring to FIG. 2, vehicle according to an exemplary embodiment may include a navigation system configured to calculate driving route information and deliver the information to the vehicle; a database 120 configured to store a plurality of sound sources, a controller 130 configured to operate the speaker 140 to select a sound source from the database 120 based on the driving route information received from the navigation system, and to output a driving sound generated based on the selected sound source, and a speaker 140 configured to output driving sound based on a control signal from the controller 130.

As described above, the navigation system may include an AVN apparatus 110 provided in a vehicle and a navigation terminal 200 owned by a driver. The navigation system may be configured to transmit various information by performing intra-vehicle communication and/or short-range communication and/or long-distance communication with the controller 130. For example, the driving route information calculated by the navigation system may be transmitted to the controller 130.

The database 120 according to an exemplary embodiment may be configured to store a plurality of sound sources classified as a plurality of emotions and/or a plurality of sound sources classified as a plurality of terrain. At this time, the plurality of emotions may include emotions such as happiness, joy, sadness, vigor, fear, anger, and tranquility, and the plurality of terrain may include terrains such as cities, mountains, rivers, highways, beaches, and tunnels.

For example, the database 120 may be configured to store a plurality of sound sources classified as a joy state, and a plurality of sound sources classified as 'joy' may be once again distinguished within the category of 'joy' according to the ratio of the 'joy' status. In addition, the database 120 may be configured to store a plurality of sound sources classified as 'city' terrain, and the plurality of sound sources can be once again distinguished within the category of the "city" terrain according to the ratio of the "city" terrain. Specifically, the database 120 may be configured to store a sound source corresponding to an emotional state in which the ratio of the driver's joy state is about 75% and the rate of the sad state is about 25%. In addition, the database 120 may be configured to store a sound source corresponding to a topographic ratio in which the city ratio of the map image is about 75% and the mountain ratio is about 25%.

Database 120 may be implemented in at least one of a Nonvolatile memory devices such as cache, Read Only Memory (ROM), Programmable ROM (PROM), Erasable Programmable ROM (EPROM), Electrically Erasable Programmable ROM (EEPROM), and Flash memory or a volatile memory device such as random access memory (RAM) or a storage medium such as a hard disk drive (HDD) or CD-ROM for store various information, but is not limited thereto. The database 120 may be a memory implemented as a separate chip, or a processor 131 corresponding to the controller 130 and a single chip.

The controller 130 according to an exemplary embodiment may select at least one sound source from among a plurality of sound sources stored in the database 120 based on data received from the navigation system. In addition, the controller 130 may be configured to synthesize the driving sound based on each selected sound source and determine a playback period in which the synthesized driving sound is output.

For example, the controller 130 may be configured to output the landmark name based on the route guidance text included in the driving route information calculated by the navigation system, output the ratio of the first emotion and the ratio of the second emotion corresponding to the landmark name based on the landmark name, select a first sound source from among a plurality of sound sources classified as a first emotion based on the ratio of the first emotion, select a second sound source from among a plurality of sound sources classified as a second emotion based on the ratio of the second emotion, determine a first playback period and a second playback period based on the ratio of the first emotion and the ratio of the second emotion, and output the first sound generated based on the first sound source during the first playback period by the speaker 140, and output a second sound generated based on the second sound source during the second playback period.

In another example, controller 130 may be configured to receive the map image output from the navigation system, output the ratio of the first color and the second color forming the map image, select a first sound source from among a plurality of sound sources classified as a first terrain based on the ratio of the first color, select a second sound source from among a plurality of sound sources classified as the second terrain based on the ratio of the second color, determine a first playback period and a second playback period based on the ratio of the first color and the second color, and output the first sound generated based on the first sound source during the first playback period, and output a second sound generated based on the second sound source by the speaker 140.

The controller 130 may include at least one memory 132 configured to store a program for outputting the landmark name based on the route guidance text, a program that outputs the ratio of emotions corresponding to the landmark name, a program for selecting at least one sound source based on the ratio of emotions, a program for processing the map image and outputting the ratio of colors forming the map image, a program for outputting the ratio of the terrain corresponding to the ratio of the color, a program for selecting at least one sound source based on the ratio of the terrain, a program for generating driving sound, and at least one processor 131 capable of executing a program stored in at least one memory 132.

The programs stored in the memory 132 include Natural Language Processing (NLP) algorithm, K-means algorithm, Convolutional Neural Networks (CNN) algorithm, Generative Adversarial Networks (GAN) algorithm, and RNN (Recurrent). Neural Networks) algorithm, long short-term memory (LSTM) algorithm, which is a kind of RNN algorithm, and an artificial intelligence algorithm (artificial neural network model) such as Region Based Convolutional Neural Networks (R-CNN) algorithm. The speaker 140 according to an exemplary embodiment may output a driving sound based on a control signal (e.g., electrical signal) received from the controller 130.

Various components of the vehicle according to the exemplary embodiment have been described in detail above. It goes without saying that the various components of the vehicle described above may be freely changed at the level of the general technical range. Hereinafter, a method of controlling a vehicle using various components of the vehicle described above will be described in detail.

Figure 3:
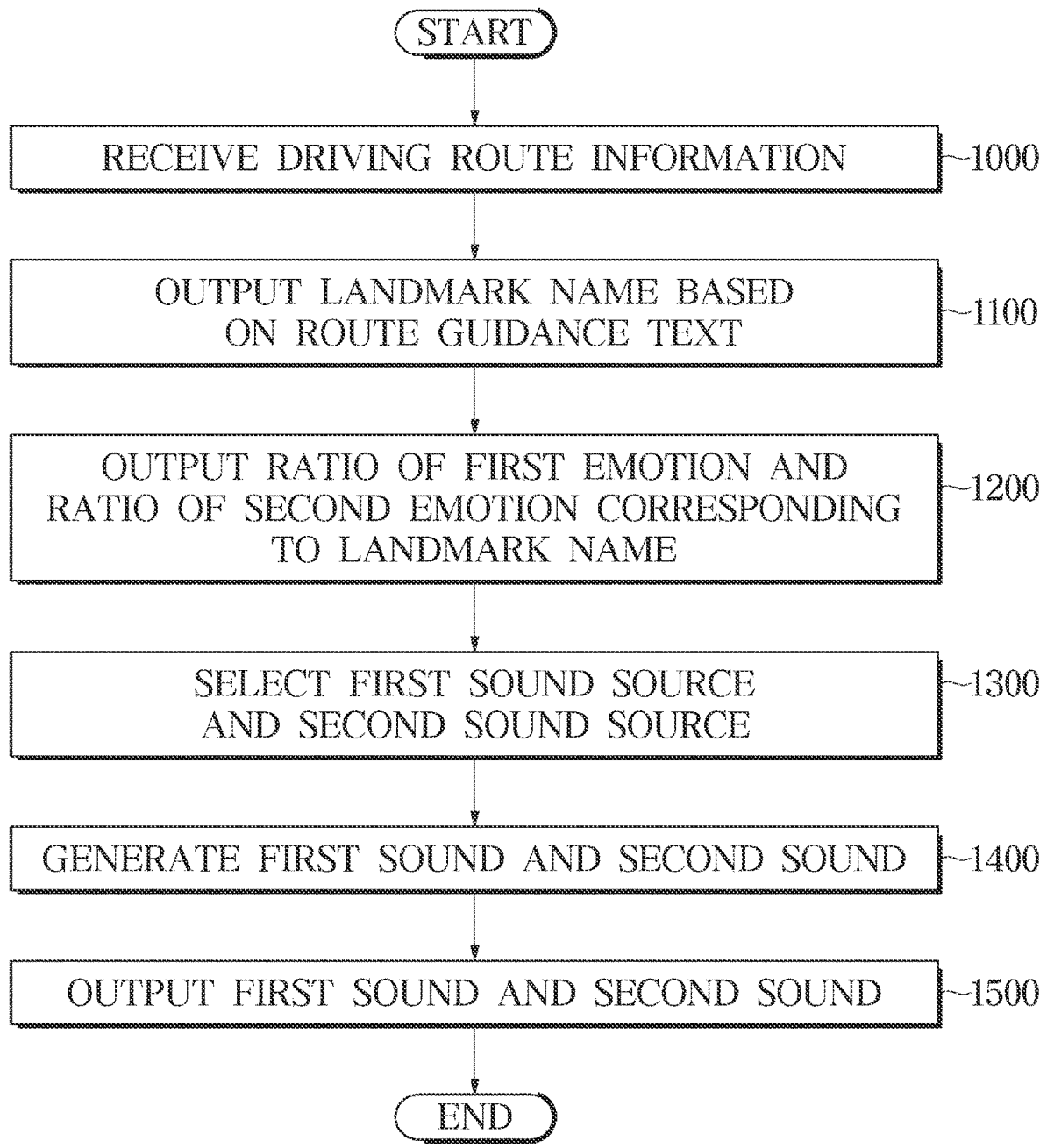
FIG. 3 is a flowchart illustrating a vehicle control according to an exemplary embodiment.
Figure 4:
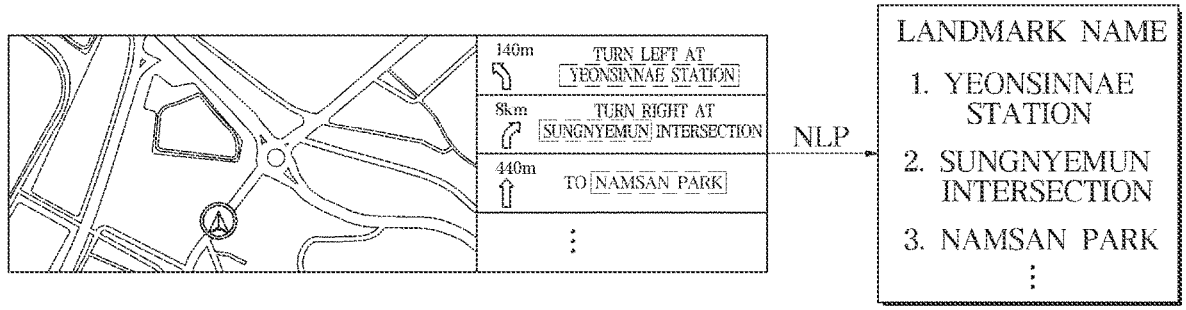
FIG. 4 is a diagram illustrating a state in which a landmark name included in a route guide text is output using natural language processing according to an exemplary embodiment.
Figure 5:
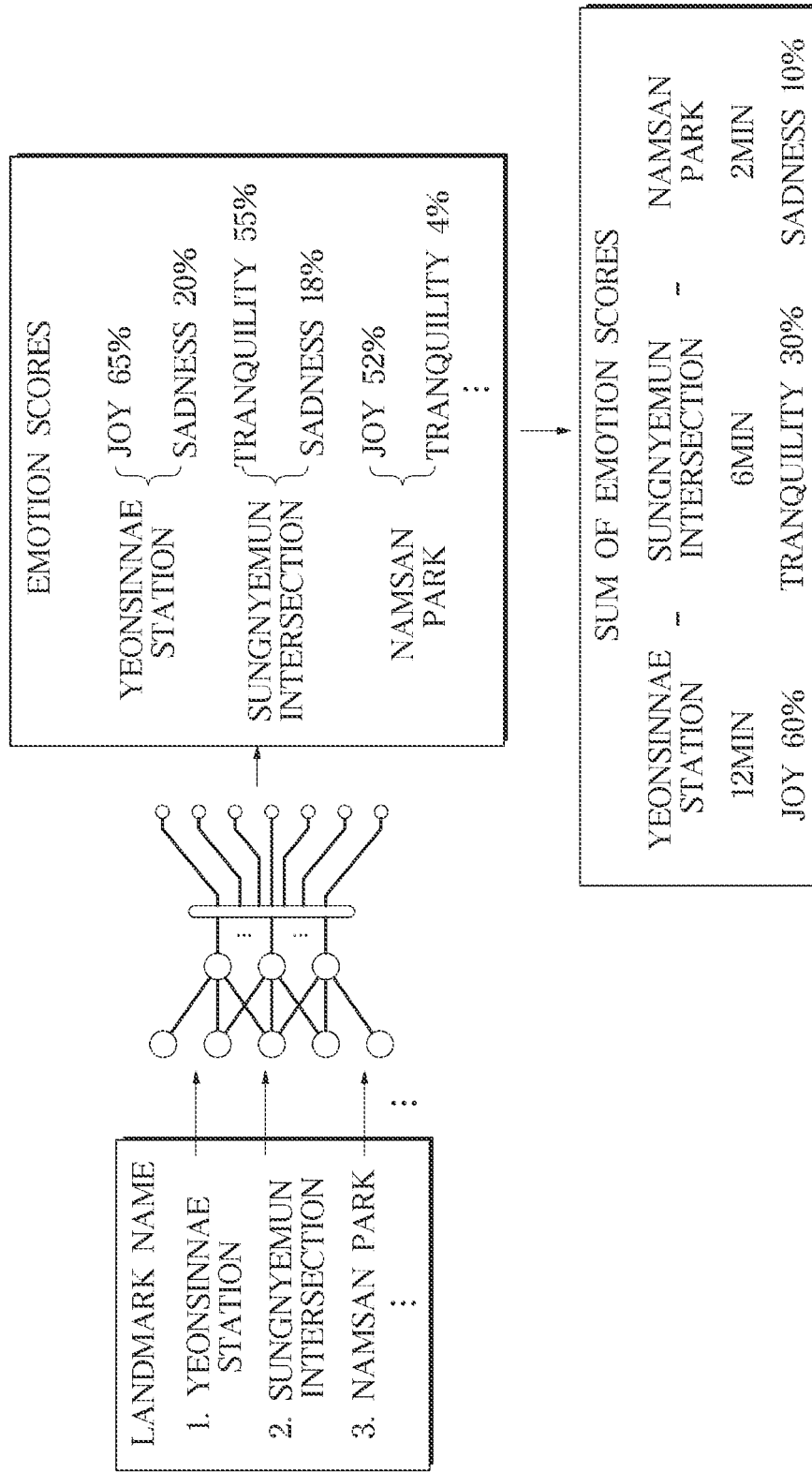
FIG. 5 is a diagram illustrating a process of outputting a ratio of emotions corresponding to a landmark name using an artificial neural network model according to an exemplary embodiment.
Figure 6:
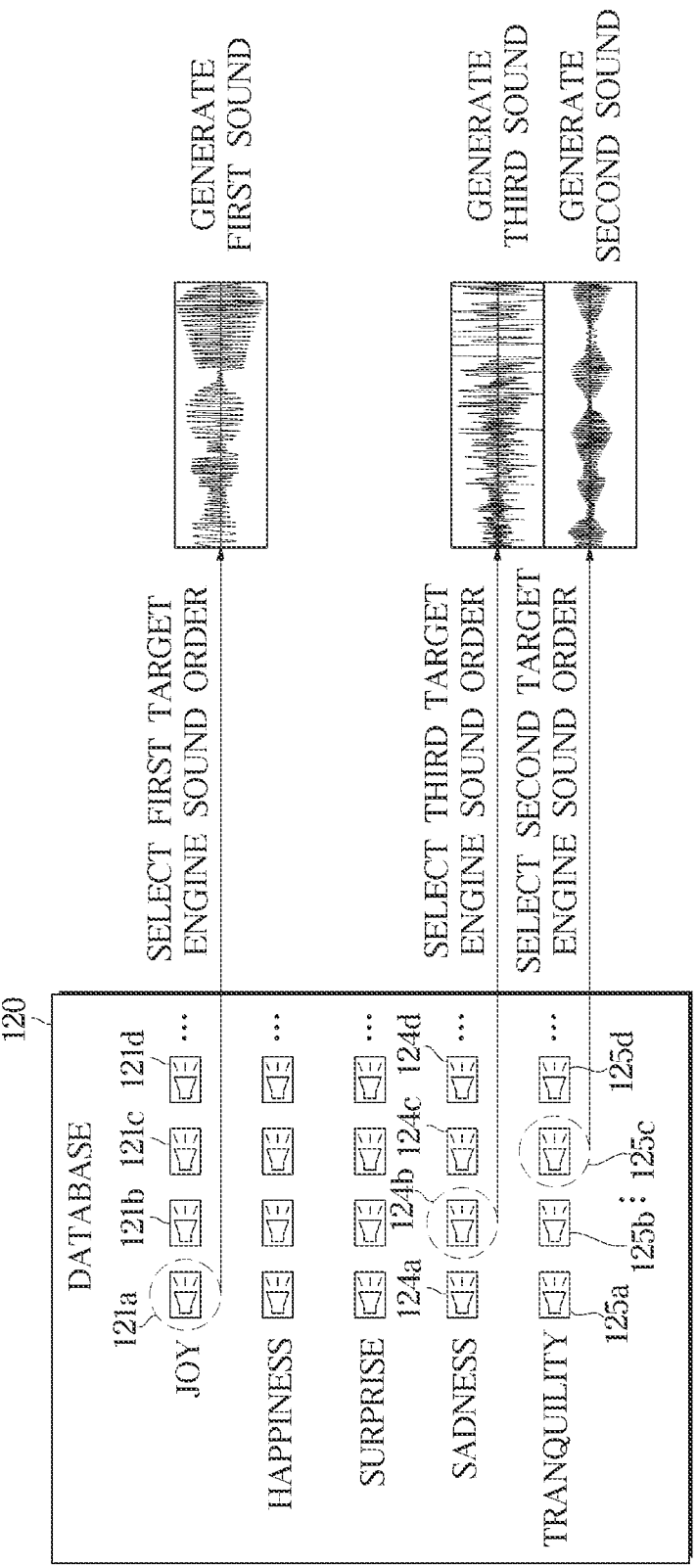
FIG. 6 is a diagram illustrating a process of synthesizing driving sound based on an emotion ratio according to an exemplary embodiment.

FIG. 3 is a flowchart illustrating a vehicle control according to an exemplary embodiment. FIG. 4 is a diagram illustrating a state in which a landmark name included in a route guide text is output by using natural language processing. FIG. 5 is a diagram illustrating a process of outputting a ratio of emotions corresponding to a landmark name using an artificial neural network model. FIG. 6 is a diagram illustrating a process of synthesizing driving sound based on an emotion ratio.

Referring to FIG. 3, the controller 130 according to an exemplary embodiment may receive driving route information from an internal navigation system (AVN device) 110 and/or an external navigation system (navigation terminal) 200 (1000). The controller 130 may be configured to output the landmark name based on the route guidance text included in the driving route information (1100). In particular, there may be a plurality of landmark names included in the route guidance text.

Referring to FIG. 4, the route guidance text included in the driving route information may include the text 'turn left at Yeonsinnae Station', the text 'turn right at the Sungnyemun intersection' and the text 'to Namsan Park'. The controller 130 may be configured to output the landmark name included in the route guidance text using natural language processing (NLP). For example, from the text 'turn left at Yeonsinnae Station', the controller 130 may be configured to extract only the landmark name 'Yeonsinnae Station'. From the text 'Turn right at Sungnyemun Intersection', only the landmark name 'Sungnyemun' may be extracted. Additionally, only the landmark name "Namsan Park" may be extracted from the phrase "To Namsan Park".

Specifically, the controller 130 may be configured to separate major landmark names by applying a separation rule for investigations that mention a destination and a direction. Thereafter, the controller 130 may be configured to output a ratio of emotions corresponding to the landmark name (1200). Specifically, referring to FIG. 5, the controller 130 may be configured to output a ratio of emotions corresponding to the landmark name using the landmark name as input data of the LSTM.

For example, LSTM may be configured to output the emotion ratio of about 75% of joy and about 20% of sadness when the landmark name 'Yeonsinnae Station' is input as input data. When the landmark name "Sungnyemun" is entered as input data, the emotional ratio of about 55% of tranquility and about 18% of sadness may be output. When the landmark name "Namsan Park" is entered as input data, the emotional ratio of about 52% of joy and about 4% of tranquility may be output. Accordingly, the LSTM may be learned in advance using a plurality of landmark names as training data.

The controller 130 may be configured to determine a comprehensive emotion ratio corresponding to the landmark name based on the emotion ratio corresponding to each landmark name. For example, The controller 130 may be configured to calculate the emotion ratio of about 60% of joy (hereinafter referred to as the "first emotion"), about 30% of tranquility (hereinafter referred to as the "second emotion"), and about 10% sad (hereinafter referred to as the "third emotion") for the path leading to 'Yeonsinnae Station-Sungnyemun Gate-Namsan Park'.

The controller 130 may be configured to select a first sound source based on the ratio of the first emotion, select a second sound source based on the ratio of the second emotion, and select a third sound source based on the ratio of the third emotion. (1300). In particular, the first sound source may refer to any one of sound sources classified and stored as a first emotion in the database 120, the second sound source may refer to any one of sound sources classified and stored as a second emotion in the database 120, and the third sound source may refer to any one of sound sources classified and stored as a third emotion in the database 120.

Particularly, the controller 130 may be configured to determine a first playback period, a second playback period, and a third playback period based on the first emotion ratio, the second emotion ratio, and the third emotion ratio. For example, when supposing that the estimated driving time of the route leading to 'Yeonsinnae Station-Sungnyemun-Namsan Park' is 20 minutes, the controller 130 may be configured to determine the first playback period in which the driving sound (hereinafter referred to as "first sound") generated based on the first sound source is output is 12 minutes, the second playback period in which the driving sound generated based on the second sound source (hereinafter referred to as "second sound") is output is 6 minutes, and a third playback period in which the driving sound (hereinafter referred to as "third sound") generated based on the third sound source is output may be determined as 2 minutes. The controller 130 may be configured to generate a first sound, a second sound, and a third sound based on the first sound source, the second sound source, and the third sound source (1400).

Referring to FIG. 5, the controller 130 may be configured to select a sound source 121*a* corresponding to a ratio of the first emotion from among a plurality of sound sources 121*a*, 121*b*, 121*c*, and 121*d* classified as a first emotion in the database 120. In addition, the controller 130 may be configured to select the sound source 125*c* corresponding to the ratio of the second emotion from among the plurality of sound sources 125*a*, 125*b*, 125*c*, and 125*d* classified as the second emotion in the database 120.

In addition, the controller 130 may be configured to select a sound source 124*b* corresponding to the ratio of the third emotion from among a plurality of sound sources 124*a*, 124*b*, 124*c*, 124*d* classified as third emotion in the database 120. The controller 130 may be configured to determine a plurality of first target engine sound orders based on at least one of an output torque, a speed, and an accelerator pedal effort of the vehicle during the first reproduction period, and synthesize the first sound based on the selected first sound source 121*a* and a plurality of first target engine sound orders.

Likewise, the controller 130 may be configured to determine a plurality of second target engine sound orders based on at least one of an output torque, a speed, and an accelerator pedal effort of the vehicle during the second playback period, synthesize a second sound based on the selected second sound source 125*c* and a plurality of second target engine sound orders, determine a plurality of third target engine sound orders based on at least one of an output torque, a speed, and an accelerator pedal effort of the vehicle during the third playback period, and synthesize a third sound based on the selected third sound source 124*b* and a plurality of third target engine sound orders.

In the case of an electric vehicle, since it does not have an engine, the target engine sound order is unable to be selected based on the engine RPM. Accordingly, the controller 130 may be configured to estimate the RPM assuming that the vehicle is equipped with an engine based on at least one of the vehicle's output torque, speed, and accelerator pedal effort, and determine a plurality of target engine sound orders based on the engine RPM. In other words, the database 120 or the memory 132 may be configured to store a lookup table indicating a relationship between a specific output torque of the vehicle, a specific speed, and a specific accelerator pedal effort, and a target engine sound order, and the controller 130 may be configured to determine a plurality of target engine sound orders based on a lookup table stored in the database 120 or the memory 132.

The controller 130 may be configured to select some of the first target engine sound orders from among the first target engine sound orders determined according to the lookup table based on the first emotion ratio, the second emotion ratio, and the third emotion ratio. For example, even when the first target engine sound order determined based on at least one of the vehicle's output torque, speed, and accelerator pedal pressure is the 1st, 2nd, 6th, and 7th order, only the first and second orders may be selected as the first target engine sound order according to the ratio of the first emotion, the ratio of the second emotion, and the ratio of the third emotion.

For example, as the ratio of the second emotion corresponding to the tranquility state is higher, only a lower order may be selected as the target engine sound order to generate a more peaceful driving sound. The controller 130 may be configured to determine a plurality of second target engine sound orders and a plurality of third target engine sound orders in the same manner as above, and may be configured to select the second target engine sound order and the third target engine sound order according to the first emotion ratio, the second emotion ratio, and the third emotion ratio.

The controller 130 may be configured to generate a first sound by synthesizing the first sound source 121a selected from the database 120 and a signal having the selected first target engine sound order, generate a second sound by synthesizing the second sound source 125c selected from the database 120 and a signal having the selected second target engine sound order, and generate a third sound by synthesizing the third sound source 124b selected from the database 120 and a signal having the selected third target engine sound order.

A signal having a target engine sound order used for synthesis may be stored in the memory 132 or the database 120. Thereafter, the controller 130 may be configured to operate the speaker 140 to output the finally generated first sound during the first playback period, output the second sound during the second playback period, and output the third sound during third playback period (1500).

In particular, the controller 130 may be configured to determine volumes of the first sound, the second sound, and the third sound based on at least one of an output torque of the vehicle, a speed, and an accelerator pedal pressure. For example, the controller 130 may be configured to determine the volume of the first sound, the second sound, and the third sound higher as the vehicle output torque, speed, and accelerator pedal pressure increase.

According to the vehicle and the vehicle control method according to the exemplary embodiment described above, it may be possible to provide various driving sounds that automatically reflect the name of the landmark included in the driving route instead of always the same driving sound in the vehicle. Accordingly, it may be possible to increase the marketability of the vehicle by giving the driver the pleasure of driving.

Figure 7:
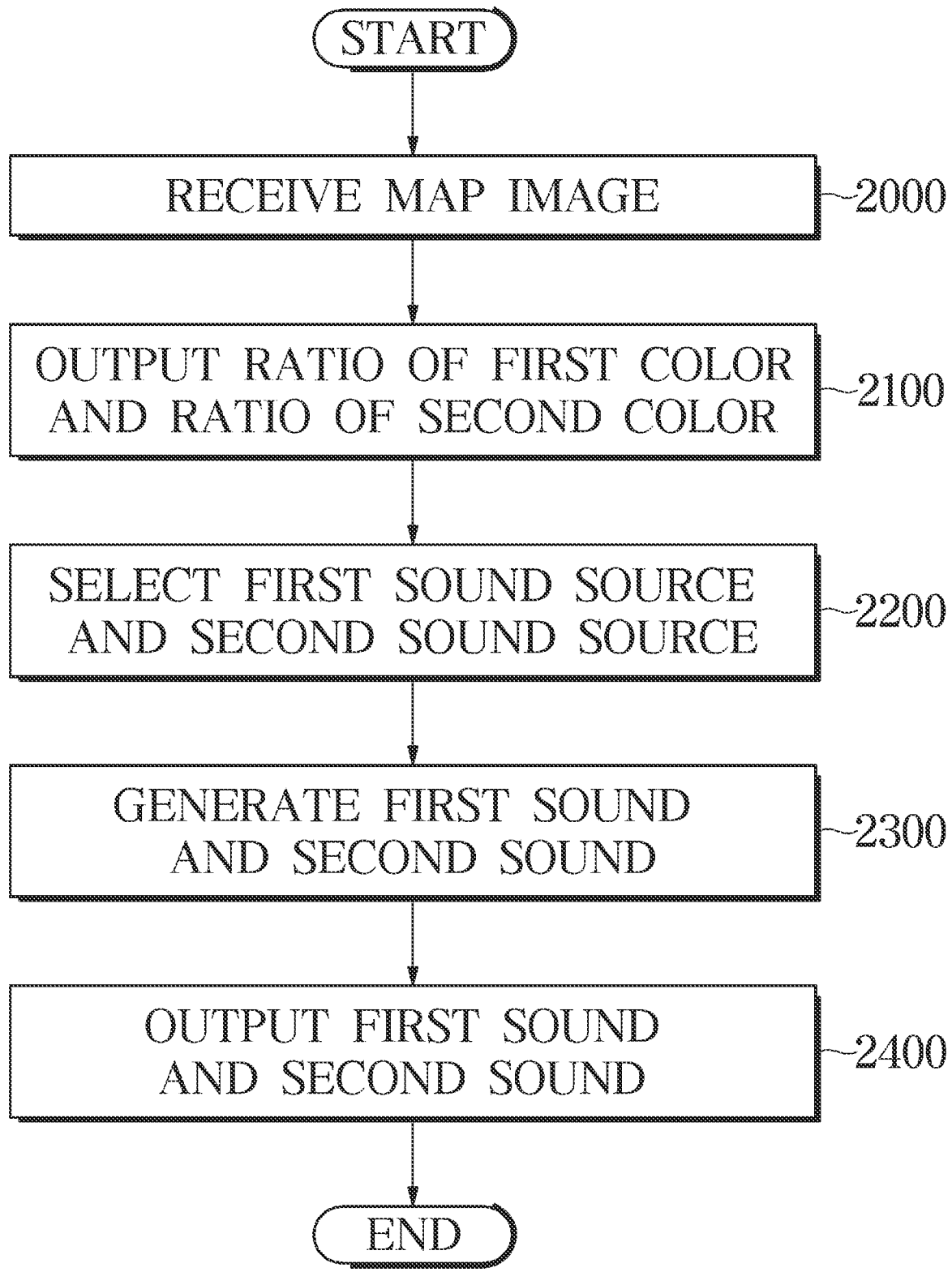
FIG. 7 is a flowchart of a vehicle control according to another exemplary embodiment.
Figure 8:
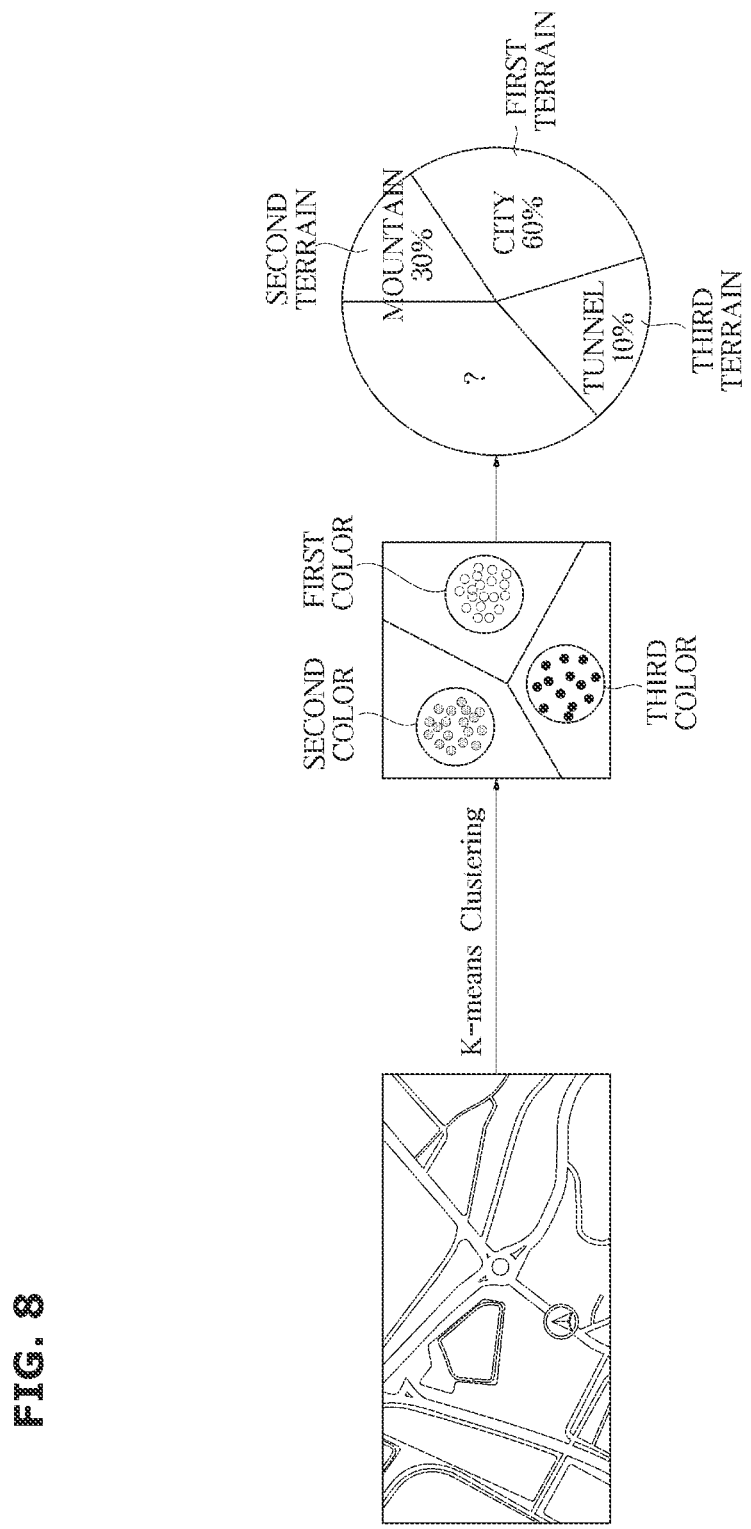
FIG. 8 is a diagram illustrating a state in which a terrain included in a map image is determined using a specific algorithm according to an exemplary embodiment.
Figure 9:
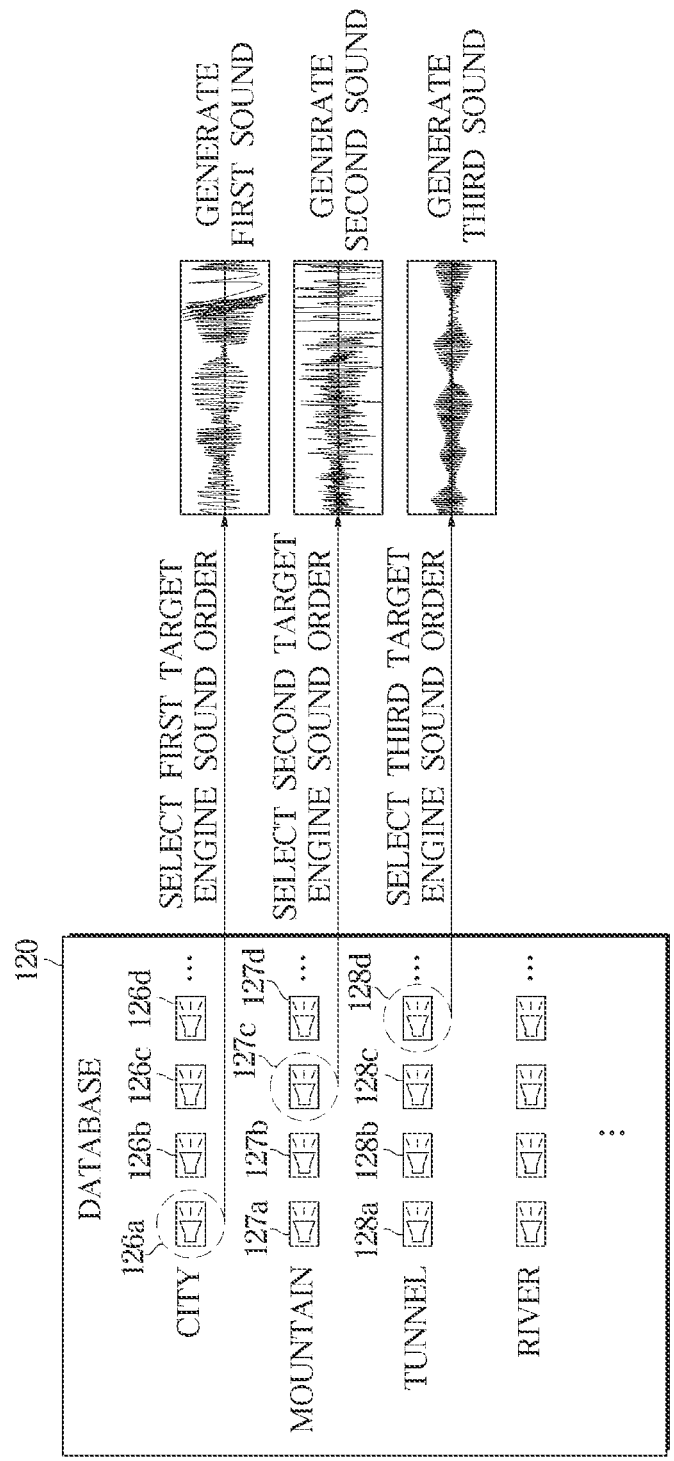
FIG. 9 is a diagram illustrating a process of synthesizing a driving sound based on a terrain ratio according to an exemplary embodiment.

Hereinafter, a method of controlling a vehicle according to another exemplary embodiment will be described in detail with reference to FIGS. 7 to 9. FIG. 7 is a flowchart of a vehicle control according to another exemplary embodiment. FIG. 8 is a diagram illustrating a state in which a terrain included in a map image is determined using a specific algorithm. FIG. 9 is a diagram illustrating a process of synthesizing a driving sound based on a terrain ratio.

Referring to FIG. 7, the controller 130 according to an exemplary embodiment may be configured to receive a map image from an internal navigation system (AVN device) 110 and/or an external navigation system (navigation terminal) 200 (2000). In particular, the controller 130 may be configured to receive the map image at preset intervals. The controller 130 may be configured to perform compression/change processing on the map image output from the navigation system, and output a ratio of colors included in the map image based on RGB data of the map image (2100).

Specifically, referring to FIG. 8, the controller 130 may be configured to convert the color information of the map image into RGB format, convert the image size into a preset training data size, and then extract RGB information of each pixel, convert 3D data of RGB into 2D data and then apply a K-average algorithm to output the ratio of the first color and the second color and the third color forming the map image. In other words, the controller 130 may be configured to compress the map image and cluster the compressed map image by color using the K-means algorithm.

Assuming that the map image is classified into a first color, a second color, and a third color, the controller 130 may be configured to associate each color with each terrain. For example, the controller 130 may be configured to match gray (hereinafter referred to as 'first color') to a city (hereinafter referred to as 'first terrain'), and match green (hereinafter referred to as 'second color') to a mountain (hereinafter referred to as 'second terrain') and match black (hereinafter referred to as 'third color') to a tunnel (hereinafter referred to as 'third terrain').

Information on the terrain corresponding to each color may be stored in the database 120 and/or the memory 132. After that, controller 130 may be configured to determine the ratio of the first terrain, the ratio of the second terrain, and the ratio of the third terrain based on the ratio of the number of pixels clustered in the first color, the ratio of the number of pixels clustered in the second color, and the ratio of the number of pixels clustered in the third color.

For example, the controller 130 may be configured to determine the ratio of the first terrain as about 60%, the second terrain as about 30%, and the third terrain as about 10%. In particular, the type of color and the terrain may not match 1:1. For example, it may be a topographic map city corresponding to gray, and a topographic map city corresponding to beige. In other words, each of the first color, the second color, and the third color may include a plurality of colors.

Referring to FIG. 9, the controller 130 may be configured to select a first sound source 126a from among a plurality of sound sources 126a, 126b, 126c, and 126d classified as a first terrain based on the ratio of the first color, select a second sound source 127c from among a plurality of sound sources 127a, 127b, 127c, and 127d classified as a second terrain based on the ratio of the second color, and select a third sound source 128d from among a plurality of sound sources 128a, 128b, 128c, and 128d classified as a third terrain based on the ratio of the third color (2200).

Particularly, the controller 130 may be configured to determine a first playback period, a second playback period, and a third playback period based on the ratio of the first color, the ratio of the second color, and the ratio of the third color. In other words, the controller 130 may be configured to determine the first playback period, the second playback period, and the third playback period based on the ratio of the first terrain, the ratio of the second terrain, and the ratio of the third terrain, respectively.

For example, assuming that the reception period of receiving a map image from a navigation system is 20 minutes, the controller 130 may be configured to set the first playback period in which the driving sound (hereinafter referred to as "first sound") generated based on the first sound source 126a is output as 12 minutes, the second playback period in which the driving sound (hereinafter referred to as "second sound") generated based on the second sound source 127c is output is 6 minutes, the third playback period in which the driving sound (hereinafter referred to as "third sound") generated based on the third sound source 128d is output may be determined as 2 minutes.

As described above, the controller 130 may be configured to determine a plurality of first target engine sound orders based on at least one of an output torque, a speed, and an accelerator pedal pressure of the vehicle during the first playback period, and synthesize the first sound based on the selected first sound source 126a and a plurality of first target engine sound orders.

Likewise, the controller 130 may be configured to determine a plurality of second target engine sound orders based on at least one of an output torque, a speed, and an accelerator pedal pressure of the vehicle during the second playback period, synthesize a second sound based on the selected second sound source 127c and a plurality of second target engine sound orders, and determine a plurality of third target engine sound orders based on at least one of an output torque, a speed, and an accelerator pedal pressure of the vehicle during the third playback period, and synthesize a third sound based on the selected third sound source 128d and a plurality of third target engine sound orders.

In particular, the controller 130 may be configured to select some of the first target engine sound orders from among the first target engine sound orders determined according to the lookup table based on the ratio of the first color (the ratio of the first terrain), the ratio of the second color (the ratio of the second terrain), and the ratio of the third color (the ratio of the third terrain).

For example, even when the first target engine sound order determined based on at least one of the vehicle's output torque, speed, and accelerator pedal pressure is the 1st, 2nd, 6th, and 7th order, only the first and second orders may be selected as the first target engine sound order according to the ratio of the first color, the ratio of the second color, and the ratio of the third color.

For example, as the ratio of the second terrain corresponding to the mountain is higher, only a lower order may be selected as the target engine sound order to generate a more peaceful driving sound. The controller 130 may be configured to determine a plurality of second target engine sound orders and a plurality of third target engine sound orders in the same manner as above, and may be configured to select some of the second target engine sound order and the third target engine sound order according to the ratio of the first color, the second color, and the third color.

Additionally, the controller 130 may be configured to generate a first sound by synthesizing the first sound source 126a selected from the database 120 and a signal having the selected first target engine sound order, generate a second sound by synthesizing the second sound source 127c selected from the database 120 and a signal having the selected second target engine sound order, and generate a third sound by synthesizing the third sound source 128d selected from the database 120 and a signal having the selected third target engine sound order (2300).

Thereafter, the controller 130 may be configured to operate the speaker 140 to output the finally generated first sound during the first playback period, and output the second sound during the second playback period, and output the third sound during the third playback period (2400). In particular, the controller 130 may be configured to determine volumes of the first sound, the second sound, and the third sound based on at least one of an output torque of the vehicle, a speed, and an accelerator pedal pressure. For example, the controller 130 may be configured to determine the volume of the first sound, the second sound, and the third sound higher as the vehicle output torque, speed, and accelerator pedal pressure increase.

According to the vehicle and the vehicle control method according to the exemplary embodiment described above, it may be possible to provide various driving sounds that automatically reflect a map image based on a current vehicle location, not always the same driving sound in the vehicle. Accordingly, it may be possible to increase the marketability of the vehicle by giving the driver the pleasure of driving.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a non-transitory computer-readable recording medium.

The non-transitory computer-readable recording medium includes all types of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although exemplary embodiments of the present disclosure have been shown and described, it would be appreciated by those skilled in the art that changes may be made to these embodiments without departing from the principles and spirit of the present disclosure, the scope of which is defined in the claims and their equivalents.

According to the present disclosure, it is possible to satisfy a user's request by outputting a driving sound generated based on information received from a navigation system instead of outputting a uniform driving sound.

What is claimed is:

1. A vehicle, comprising:
    a database configured to store a plurality of sound sources classified as a first terrain and a plurality of sound sources classified as a second terrain;
    a speaker; and
    a controller configured to:
        receive map image output from a navigation system;
        output a ratio of first color and a ratio of second color forming the map image by processing the map image;
        select a first sound source from among a plurality of sound sources classified as the first terrain based on the ratio of the first color;
        select a second sound source from among a plurality of sound sources classified as the second terrain based on the ratio of the second color;
        determine a first playback period and a second playback period based on the ratio of the first color and the ratio of the second color;
        output a first sound generated based on the first sound source during the first playback period by the speaker; and
        output a second sound generated based on the second sound source during the second playback period;

wherein the first playback period is determined to be longer than the second playback period when the ratio of the first color is higher than the ratio of the second color.

2. The vehicle according to claim 1, wherein the controller is configured to compress the map image, and cluster the compressed map image by color using a K-means algorithm.

3. The vehicle according to claim 1, wherein the controller is configured to match the first color to the first terrain, and match the second color to the second terrain.

4. The vehicle according to claim 1, wherein the controller is configured to:
   determine a plurality of first target engine sound orders based on at least one of output torque, speed, and accelerator pedal pressure of the vehicle during the first playback period in which the first sound is output and synthesize the first sound based on the first sound source and the plurality of first target engine sound orders; and
   determine a plurality of second target engine sound orders based on at least one of output torque, speed, and accelerator pedal pressure of the vehicle during the second playback period in which the second sound is output and synthesize the second sound based on the second sound source and the plurality of second target engine sound orders.

5. The vehicle according to claim 4, wherein the controller is configured to:
   select a first target engine sound order of some of the plurality of first target engine sound orders based on the ratio of the first color and the ratio of the second color, and synthesize the first sound based on the first sound source and the selected partial first target engine sound order, and
   select a second target engine sound order of some of the plurality of second target engine sound orders based on the ratio of the first color and the ratio of the second color, and synthesize the second sound based on the second sound source and the selected partial second target engine sound order.

6. The vehicle according to claim 1, wherein the controller is configured to determine volume of the first sound and the second sound based on at least one of an output torque, a speed, and an accelerator pedal pressure of the vehicle.

7. The vehicle according to claim 1, wherein the first terrain and the second terrain are one of a city, mountain, river, highway, beach or tunnel.

8. A controlling method of a vehicle including a database storing a plurality of sound sources classified as a first terrain and a plurality of sound sources classified as a second terrain, the method comprising:
   receiving, by a controller, map image output from a navigation system;
   outputting, by the controller, a ratio of first color and a ratio of second color constituting the map image by processing the map image;
   selecting, by the controller, a first sound source from among a plurality of sound sources classified as the first terrain based on the ratio of the first color, selecting a second sound source from among a plurality of sound sources classified as the second terrain based on the ratio of the second color;
   determining, by the controller, a first playback period and a second playback period based on the ratio of the first color and the ratio of the second color; and
   outputting, by the controller, a first sound generated based on the first sound source during the first playback period by the speaker, and outputting a second sound generated based on the second sound source during the second playback period;
   wherein the first playback period is determined to be longer than the second playback period when the ratio of the first color is higher than the ratio of the second color.

9. The method according to claim 8, wherein outputting a ratio of first color and a ratio of second color forming the map image by processing the map image includes compressing the map image, and clustering the compressed map image by color using a K-means algorithm.

10. The method according to claim 8, wherein selecting a first sound source from among a plurality of sound sources classified as the first terrain based on the ratio of the first color, selecting a second sound source from among a plurality of sound sources classified as the second terrain based on the ratio of the second color includes matching the first color to the first terrain, and matching the second color to the second terrain.

11. The method according to claim 8, wherein the method further comprises:
   determining a plurality of first target engine sound orders based on at least one of output torque, speed, and accelerator pedal pressure of the vehicle during the first playback period in which the first sound is output and synthesize the first sound based on the first sound source and the plurality of first target engine sound orders; and
   determining a plurality of second target engine sound orders based on at least one of output torque, speed, and accelerator pedal pressure of the vehicle during the second playback period in which the second sound is output and synthesize the second sound based on the second sound source and the plurality of second target engine sound orders.

12. The method according to claim 11, wherein the method further comprises:
   selecting a first target engine sound order of some of the plurality of first target engine sound orders based on the ratio of the first color and the ratio of the second color, and synthesize the first sound based on the first sound source and the selected partial first target engine sound order, and
   selecting a second target engine sound order of some of the plurality of second target engine sound orders based on the ratio of the first color and the ratio of the second color, and synthesize the second sound based on the second sound source and the selected partial second target engine sound order.

13. The method according to claim 8, wherein the first terrain and the second terrain are one of a city, mountain, river, highway, beach or tunnel.

* * * * *